United States Patent Office 3,483,019
Patented Dec. 9, 1969

3,483,019
METHOD OF APPLYING A GRAPHITE COATING TO GLASS FIBERS IN TEXTILE FORMS
Earl L. Youse, Berkeley Heights, N.J., assignor to The Joseph Dixon Crucible Company, Jersey City, N.J., a corporation of New Jersey
No Drawing. Continuation-in-part of application Ser. No. 405,603, Oct. 21, 1964. This application July 3, 1968, Ser. No. 742,196
Int. Cl. C03c 25/02
U.S. Cl. 117—69       11 Claims

ABSTRACT OF THE DISCLOSURE

A method of applying a lubricant coating to fibrous glass textiles is disclosed. The glass textile is treated with a solution of weak boric acid or weak dibasic organic acid and dried to form a coating on the glass fibers. The acid coated material is then treated with a soluble silicate containing a solid lubricant such as graphite, metal oxide or metal sulfide to form a solid lubricant-soluble silicate coating thereon. The coated textile is useful in the manufacture of filter bags.

---

This application is a continuation-in-part of application Ser. No. 405,603, filed Oct. 21, 1964, now abandoned.

Background of the invention

This invention relates to solid lubricant dispersions and method of applying to fiber glass textile forms suitable for the formation of dry film lubricating coatings. Fiber glass fabric is fabricated into filter bags used in dust collectors for filtration of hot industrial flue gases to remove particulate contaminates such as dust, silt, and soot. Industries such as steel mills, cement mills, power generating stations, and heavy chemical industries are confronted with a particularly severe problem of alleviating air pollution.

Use of fiber glass fabric without any solid lubricant treatment results in shortened lift of filter bags from shaking or flexing of the bags to discharge the collected solid contaminates. Flexing of uncoated filter bags causes abrasion of the glass fibers resulting in breakage and tearing, thereby shortening bag life.

The object of this invention is to improve fiber glass filter fabric by applying a high temperature resistant graphite coating with inorganic binder. This coating withstands the high temperature and corrosiveness of hot flue gases and lubricates the fibers to prolong life and prevent breaking and tearing giving superior flex resistance.

Graphite appears to be the preferred solid lubricant because of economics, however solid lubricants other than graphite may be used, either alone or in combination. Other suitable lamellar solid lubricants include various sulfides, selenides, and tellurides of metals such as tungsten, molybdenum, lead, silver, etc. Various polytetrafluoroethylene polymers such as Du Pont "Teflon" may also be used as the solid lubricant.

Increased endurance would reduce cost of bag replacement. A graphite coating to extend temperature range and permit use of fiber glass filter fabric at high temperatures will extend their usefulness for dust removal in many industries.

This graphite coating on fiber glass textile forms may serve to impart conductivity, shielding, or lubricate the coated fibers to prevent abrasive wear. Such graphite coated textile forms may have additional uses for shielding aircraft and missile hook-up wires or cables, microwave guides, or radar shielding.

According to this invention, it has been found that the above and related articles can be formed by initially acidifying the surface by pre-coating the fiber glass with a selected weak acid, drying, and subsequently applying a lubricating coating of graphite fixed by drying with a soluble silicate film former. Heretofore, it has not been possible to apply soluble silicates of strong alkalinity (high ratios of alkali/silica) directly to fiber glass because of attack and tendering of the fibers. It has been found by using special pretreatment coatings before application of strongly alkaline soluble silicate solutions, tendering of the fibers can be avoided. Pretreatment coatings are generally weak organinc or inorganic acids selected from a group consisting of boric acid, dibasic organic acids such as (oxalic), phenol (carbolic acid), or dicarboxylic acids (succinic, maleic, fumaric).

A cold solution of 3% by weight of boric acid in water has been used as a pretreatment coating. This is approximately the limit of solubility (saturated solution) of boric acid in cold water. Some protection of the fiber glass from attack by alkaline soluble silicate solution was achieved. Increasing the boric acid coating using a 6% by weight boric acid solution in warm water (120° F.) resulted in more complete protection. Boric acid solutions up to the limit of solubility of boric acid in boiling water can be used. Instead of water solutions, alcohol or other organic solvents for boric acid may be used, either alone or in solvent blends. The boric acid pretreatment coating may be air dried or oven dried up to 250° F.

The coatings of this invention may be applied to the fiber glass textile form by brushing, spraying, or dipping. The preferred method of application is by immersing the fiber glass textile form in a dip bath. Weight of coating is controlled by adjusting dilution of solids in the dip bath, and squeezing the saturated fiber glass textile forms through a set of rollers.

The invention is illustrated by the following examples, but it is understood the invention is not restricted thereto.

EXAMPLE 1

A piece of fiber glass cloth from Hess Goldsmith & Co., division of Burlington Industries, was treated by immersing in a 3% by weight boric acid solution at room temperature. The treated cloth was oven dried for one hour at 250° F.

The dried and precoated cloth was then immersed in graphite coating bath prepared as follows:

| | Grams |
|---|---|
| Distilled water | 2100 |
| S–35 sodium silicate (Philadelphia Quartz Co.) | 308 |
| Dixon Suspension #94–92 (Colloidal Graphite Water Dispersion, 22% solids) | 700 |

After dipping in this graphite-sillicate solution (pH 11.8) the glass fabric was dried in an oven for one hour at 250° F.

This coated fiber glass cloth sample showed good strength and excellent coating and penetration of the graphite.

EXAMPLE 2

A sample of #112 a finish fiber glass cloth from Hess Goldsmith & Co. was treated by immersing in a warm (120° F.) solution of 6% boric acid by weight. The saturated cloth was oven dried at 250° F. for one hour.

A graphite coating was then applied by dipping the pretreated cloth in the following bath:

| | Grams |
|---|---|
| Distilled water | 2100 |
| S–35 sodium silicate (Philadelphia Quartz Co.) | 308 |
| Dixon Suspension #94–92 (Colloidal Graphite Water Dispersion, 22% solids) | 700 |

The saturated cloth was dried for one hour at 250° F.

The coated fiber glass cloth showed good tear strength and excellent graphite coating and penetration, especially at crossover points of fibers in weave pattern.

EXAMPLE 3

A 6% by weight solution of oxalic acid was dissolved in water at room temperature. A piece of glass fabric was treated by dipping into this cold solution. The saturated fabric sample was dried 15 minutes at 250° F.

A graphite coating was then applied by dipping the fabric in a graphite silicate solution prepared as in Example 2. The graphite coated fabric was dried 15 minutes at 250° F.

The fiber glass fabric was protected against attack from the strongly alkaline soluble silicate solution containing the graphite.

Other soluble silicates such as potassium silicate may also be used in the method of this invention. It is also emphasized that the solid lubricant may be added to the weak acid coating material instead of being added to the soluble silicate coating material.

The several examples as illustrated below clearly support the basic method of applying a dry solid lubricant coating to fiber glass as a novel departure from the prior art. This method includes the treating of the glass fiber with a solution of weak acid selected from the group consisting of boric acid and dibasic organic acid to form a weak acid coating on the fiber glass. This weak acid coating is then dried. The acid coated fiber glass is then treated with a highly alkaline soluble silicate containing a solid lubricant selected from the group consisting of graphite, metal oxides and metal sulfides to form a solid lubricant-soluble silicate coating on the fiber glass. The fiber glass coated with the soluble silicate is then dried to form a solid lubricant coating on the fiber glass. The highly alkaline soluble silicate solution has an alkali oxide/silicon dioxide ratio of from about 1/1.8 to about 1/3.75. The boric acid solution used in the specific examples may contain from about 3% to about 12% by weight of boric acid in solution.

Filter bags have been manufactured with fiber glass fabric treated in accordance with the process of this invention. It has been found that the removal of injurious products from industrial gases is greatly facilitated through the use of filter bags constructed with fiber glass treated in accordance with this invention. In addition, filter bags made with the fiber glass fabric treated in accordance with the process of this invention had a much more useful life than filter bags heretofore known in the prior art.

I claim:

1. A method of applying a dry solid lubricant coating to fiber glass for use in the production of filter bags comprising the steps of:
    (a) treating the fiber glass with a solution containing from about 3% to about 12% by weight of boric acid to form a boric acid coating;
    (b) drying the boric acid coating on the fiber glass;
    (c) treating the boric acid coated fiber glass with a solid lubricant-soluble silicate solution having an alkali oxide/silicon dioxide ratio of from about 1/1.8 to about 1/3.75 to form a solid lubricant-soluble silicate coating on the fiber glass; and
    (d) drying the solid lubricant-soluble silicate coating to form a solid lubricant coating on the fiber glass.

2. A method as defined in claim 1 wherein the boric acid is in an aqueous solution and the soluble silicate is sodium silicate.

3. A method as defined in claim 1 wherein the boric acid is in an aqueous solution and the soluble silicate is potassium silicate.

4. A method as defined in claim 1 wherein the boric acid is in an aqueous solution and the solid lubricant is graphite.

5. A method as defined in claim 1 wherein the boric acid is in an aqueous solution and the solid lubricant is molybdenum disulfide.

6. A method as defined in claim 1 wherein the boric acid is in an alcohol solution and the solid lubricant is graphite.

7. A method of applying a dry solid lubricant coating to fiber glass for use in the production of filter bags comprising the steps of:
    (a) treating the fiber glass with a solution of weak acids selected from the group consisting of boric acid and dibasic organic acid to form a weak acid coating on the fiber glass;
    (b) drying the weak acid coating on the fiber glass;
    (c) treating the acid coated fiber glass with a highly alkaline soluble silicate containing a solid lubricant selected from the group consisting of graphite, metal oxides and metal sulfides to form a solid lubricant-soluble silicate coating on the fiber glass, and
    (d) drying the solid lubricant-soluble silicate coating to form a solid lubricant coating on the fiber glass.

8. A method as defined in claim 7 wherein
    the dibasic organic acid is selected from the group consisting of oxalic acid, carbolic acid, succinic acid, maleic acid and fumaric acid, the metal oxide is zinc oxide and the metal sulfides are selected from the group consisting of molybdenum disulfide, lead sulfide, tungsten disulfide, and silver sulfide.

9. In a method of manufacturing filter bags wherein the bags are constructed of fiber glass fabric comprising, in combination therewith the steps of:
    (a) treating the fiber glass with a solution of weak acids selected from the group consisting of boric acid and dibasic organic acid to form a weak acid coating on the fiber glass;
    (b) drying the weak acid coating on the fiber glass;
    (c) treating the acid coated fiber glass with a highly alkaline soluble silicate containing a solid lubricant selected from the group consisting of graphite, metal oxides and metal sulfides to form a solid lubricant-soluble silicate coating on the fiber glass; and
    (d) drying the solid lubricant-soluble silicate coating to form a solid lubricant coating on the fiber glass.

10. In a method of manufacturing filter bags wherein the bags are constructed of fiber glass fabric comprising, in combination therewith the steps of:
    (a) treating the fiber glass with a solution containing from about 3% to about 12% by weight of boric acid to form a boric acid coating;
    (b) drying the boric acid coating on the fiber glass;
    (c) treating the boric acid coated fiber glass with a solid lubricant-soluble silicate solution having an alkali oxide/silicon dioxide ratio of from about 1/1.8 to about 1/3.75 to form a solid lubricant-soluble silicate coating on the fiber glass; and
    (d) drying the solid lubricant-soluble silicate coating to form a solid lubricant coating on the fiber glass.

11. In a method of manufacturing filter bags wherein the bags are constructed of fiber glass fabric comprising, in combination therewith the steps of:
    (a) treating the fiber glass with a solution of weak acids selected from the group consisting of boric acid and dibasic organic acid, said solution containing a solid lubricant selected from the group consisting of graphite metal acids and metal sulfides to form a solid-lubricant acid coating on the fiber glass;
    (b) drying the solid lubricant-acid coating on the fiber glass;
    (c) treating the solid lubricant-acid coated fiber glass with a soluble silicate to form a silicate coating on the fiber glass, and
    (d) drying the soluble silicate coating to form a solid lubricant coating on the fiber glass.

(References on following page)

References Cited

UNITED STATES PATENTS

| | | | |
|---|---|---|---|
| 2,184,320 | 12/1939 | Simpson | 91—88 |
| 2,951,773 | 9/1960 | Helle et al. | 117—211 |
| 2,952,761 | 9/1960 | Smith-Johannsen | 117—226 |
| 3,002,857 | 10/1961 | Stalego | 117—126 |
| 3,242,075 | 3/1966 | Hunter | 252—22 |

OTHER REFERENCES

A. and E. Rose: The Condensed Chemical Dictionary, 6th ed., Reinhold Publishing Corp., 1964, p. 761.

ALFRED L. LEAVITT, Primary Examiner

C. K. WEIFFEN BACH, Assistant Examiner

U.S. Cl. X.R.

117—126, 216, 226

UNITED STATES PATENT OFFICE
CERTIFICATE OF CORRECTION

Patent No. 3,483,019                          December 9, 1969

Earl L. Youse

It is certified that error appears in the above identified patent and that said Letters Patent are hereby corrected as shown below:

Column 2, lines 51 and 71, "#94-92", each occurrence, should read -- #94-22 --.

Signed and sealed this 10th day of November 1970.

(SEAL)
Attest:

Edward M. Fletcher, Jr.                      WILLIAM E. SCHUYLER, JR.
Attesting Officer                                Commissioner of Patents